(12) United States Patent
Burks

(10) Patent No.: US 10,308,141 B1
(45) Date of Patent: Jun. 4, 2019

(54) VEHICLE OCCUPANCY ALERTING SYSTEM

(71) Applicant: Ceola Burks, New Orleans, LA (US)

(72) Inventor: Ceola Burks, New Orleans, LA (US)

(\*) Notice: Subject to any disclaimer, the term of this patent is extended or adjusted under 35 U.S.C. 154(b) by 8 days.

(21) Appl. No.: 15/849,064

(22) Filed: Dec. 20, 2017

(51) Int. Cl.
| | |
|---|---|
| *B60N 2/00* | (2006.01) |
| *G08B 21/22* | (2006.01) |
| *G08B 21/24* | (2006.01) |
| *G01G 19/414* | (2006.01) |
| *B60Q 9/00* | (2006.01) |

(52) U.S. Cl.
CPC ........... *B60N 2/002* (2013.01); *G01G 19/414* (2013.01); *G08B 21/22* (2013.01); *G08B 21/24* (2013.01); *B60Q 9/00* (2013.01)

(58) Field of Classification Search
CPC ..... B60N 2/002; B60R 22/48; B60R 16/0232; B60R 22/105; B60R 21/015; G08B 21/025; G08B 21/02; G08B 21/24; G08B 21/22
USPC ... 340/539.11, 667, 457, 573.1, 457.1, 573.4
See application file for complete search history.

(56) References Cited

U.S. PATENT DOCUMENTS

| | | | | |
|---|---|---|---|---|
| 5,949,340 | A * | 9/1999 | Rossi | B60N 2/002 340/425.5 |
| 6,819,249 | B1 * | 11/2004 | Papp | B60N 2/002 307/10.1 |
| 6,922,147 | B1 | 7/2005 | Viksnins et al. | |
| 7,319,382 | B1 * | 1/2008 | Vu | B60N 2/002 340/425.5 |
| 7,701,358 | B1 * | 4/2010 | White | B60R 16/0232 340/425.5 |
| 7,714,737 | B1 * | 5/2010 | Morningstar | B60N 2/002 180/271 |
| D650,715 | S | 12/2011 | Hill et al. | |
| 9,014,920 | B1 * | 4/2015 | Torres | G08B 21/0202 701/45 |
| 9,041,523 | B1 * | 5/2015 | Birdis | B60N 2/002 180/273 |
| 9,266,471 | B2 | 2/2016 | Schoenberg et al. | |
| 9,908,436 | B2 * | 3/2018 | Jones | B60N 2/002 |
| 9,938,951 | B1 * | 4/2018 | Ghannam | B60K 15/04 |
| 9,984,571 | B2 * | 5/2018 | Sachdev | H04W 4/046 |
| 2003/0014166 | A1 * | 1/2003 | Chinigo | B60R 22/48 701/33.7 |
| 2004/0212488 | A1 * | 10/2004 | Gift | B60N 2/002 340/457 |
| 2006/0044126 | A1 * | 3/2006 | Ho | G08B 21/22 340/457 |
| 2006/0208911 | A1 * | 9/2006 | Davis | B60N 2/002 340/573.4 |
| 2007/0052529 | A1 * | 3/2007 | Perez | B60N 2/002 340/457 |
| 2007/0285219 | A1 * | 12/2007 | Greene | B60R 22/48 340/457.1 |

(Continued)

FOREIGN PATENT DOCUMENTS

WO     WO9220457     11/1992

*Primary Examiner* — Hoi C Lau

(57) ABSTRACT

A vehicle occupancy alerting system for alerting a driver of a passenger positioned in a seat of a car includes a vehicle and a plurality of seats mounted within the vehicle. The plurality of seats includes a back seat. An occupant warning system is mounted on the vehicle and warns a driver of the vehicle that a person is on the back seat when the vehicle has been turned off.

6 Claims, 5 Drawing Sheets

(56) References Cited

U.S. PATENT DOCUMENTS

| | | | |
|---|---|---|---|
| 2009/0040036 A1* | 2/2009 | Talis | B60N 2/002 |
| | | | 340/457.1 |
| 2009/0212933 A1* | 8/2009 | Salazar | B60N 2/002 |
| | | | 340/457 |
| 2014/0253314 A1* | 9/2014 | Rambadt | B60N 2/002 |
| | | | 340/457.1 |
| 2014/0266662 A1 | 9/2014 | Matos | |
| 2014/0361889 A1* | 12/2014 | Wall, II | G08B 21/025 |
| | | | 340/539.11 |
| 2015/0191122 A1* | 7/2015 | Roy | G08G 1/0962 |
| | | | 340/439 |
| 2016/0171859 A1* | 6/2016 | Bowlus | G08B 21/02 |
| | | | 340/457 |
| 2016/0297325 A1* | 10/2016 | Jones | B60N 2/002 |
| 2016/0379466 A1* | 12/2016 | Payant | G08B 21/24 |
| | | | 340/457 |
| 2017/0043783 A1* | 2/2017 | Shaw | B60H 1/00978 |
| 2017/0124987 A1* | 5/2017 | Kim | B60R 11/04 |
| 2017/0144595 A1* | 5/2017 | Rovinsky | G08B 21/24 |
| 2017/0232887 A1* | 8/2017 | Clontz | B60Q 5/005 |
| | | | 340/457 |
| 2017/0240022 A1* | 8/2017 | Ireri | B60N 2/26 |
| 2017/0263123 A1* | 9/2017 | Sachdev | H04W 4/046 |
| 2018/0056784 A1* | 3/2018 | Virgilio | B60K 28/02 |
| 2018/0080427 A1* | 3/2018 | Ghannam | B60K 15/04 |
| 2018/0105104 A1* | 4/2018 | Smith | B60H 1/00778 |
| 2018/0272894 A1* | 9/2018 | Logan | B60N 2/002 |
| 2018/0315292 A1* | 11/2018 | Pham | G08B 21/24 |

* cited by examiner

VEHICLE OCCUPANCY ALERTING SYSTEM

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION (1) Field of the Invention (2) Description of Related Art Including Information Disclosed Under 37 CFR 1.97 and 1.98

The disclosure and prior art relates to warning devices and more particularly pertains to a new warning device for alerting a driver of a passenger positioned in a seat of a car.

BRIEF SUMMARY OF THE INVENTION

An embodiment of the disclosure meets the needs presented above by generally comprising a vehicle and a plurality of seats mounted within the vehicle. The plurality of seats includes a back seat. An occupant warning system is mounted on the vehicle and is configured to warn a driver of the vehicle that a person is on the back seat when the vehicle has been turned off.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
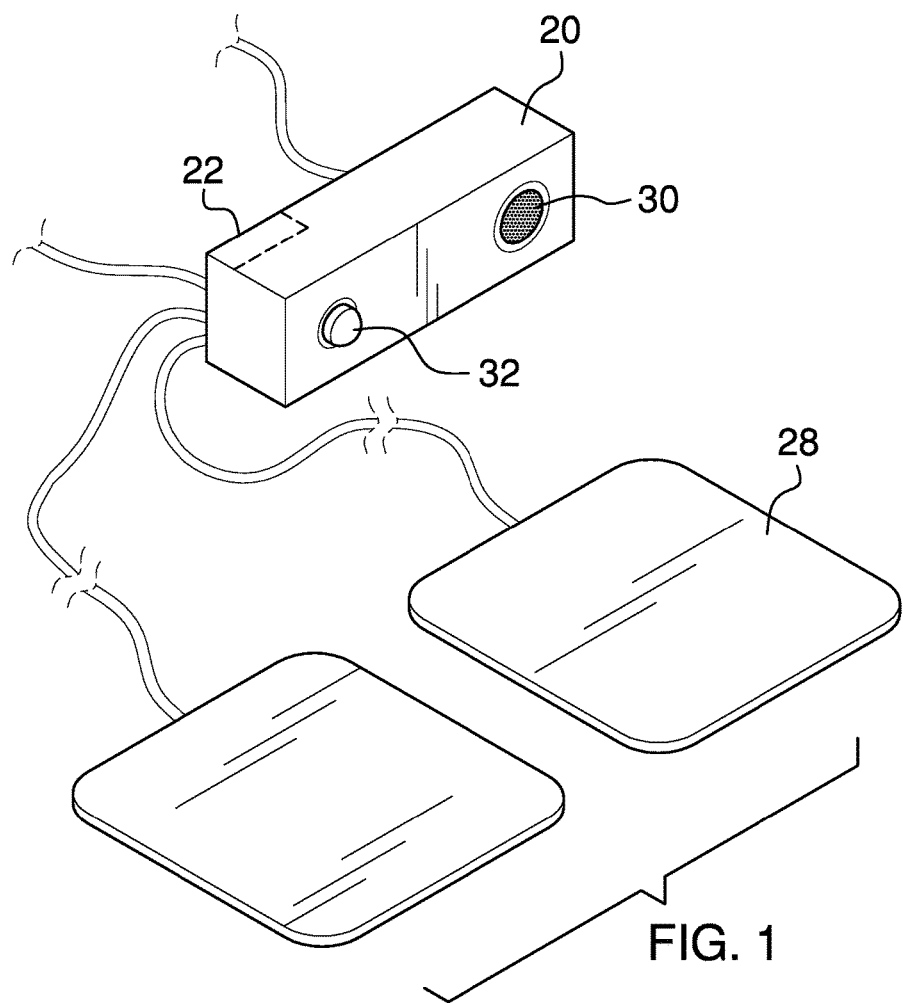
FIG. 1 is a perspective view of components of a vehicle occupancy alerting system according to an embodiment of the disclosure.
Figure 2:
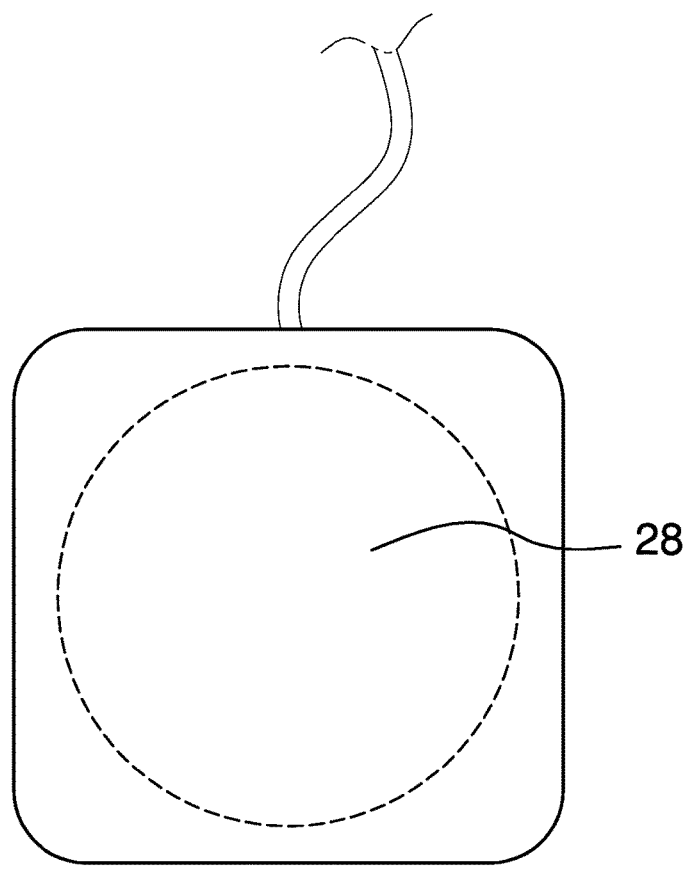
FIG. 2 is a top view of an embodiment of the disclosure.
Figure 3:
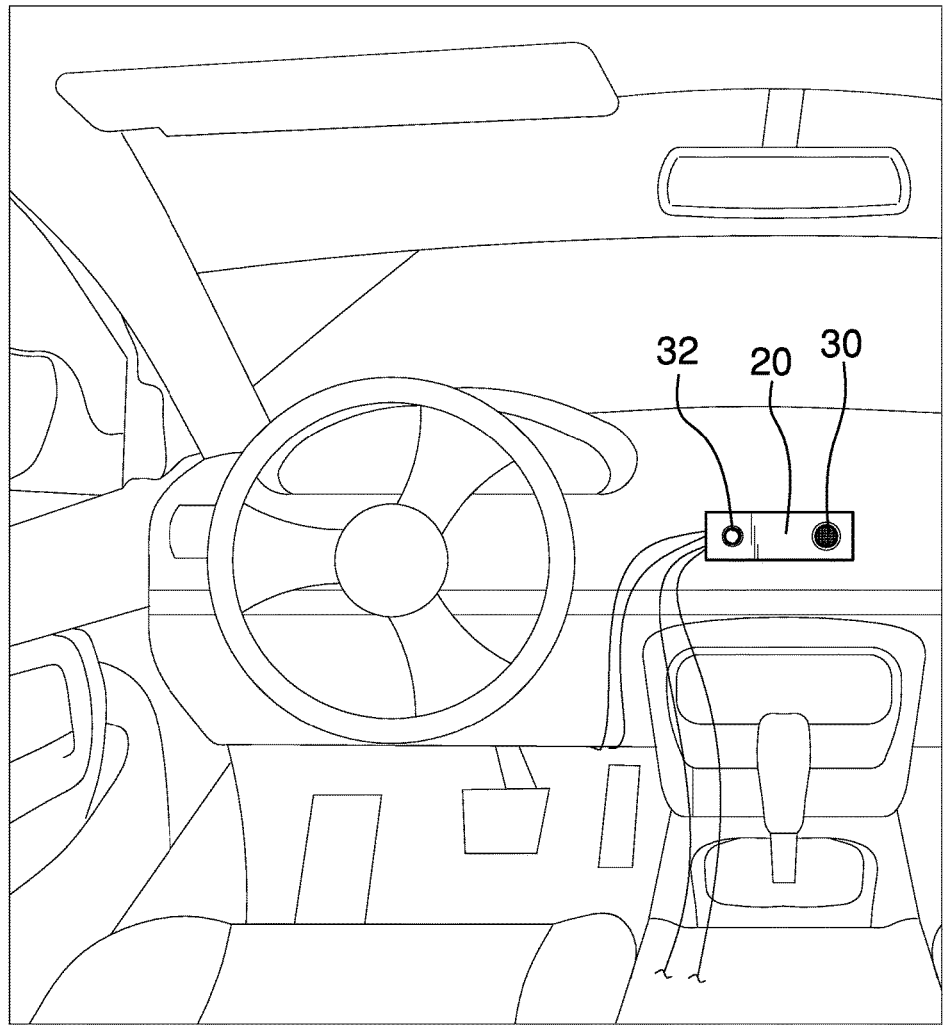
FIG. 3 is a front view of an embodiment of the disclosure.
Figure 4:
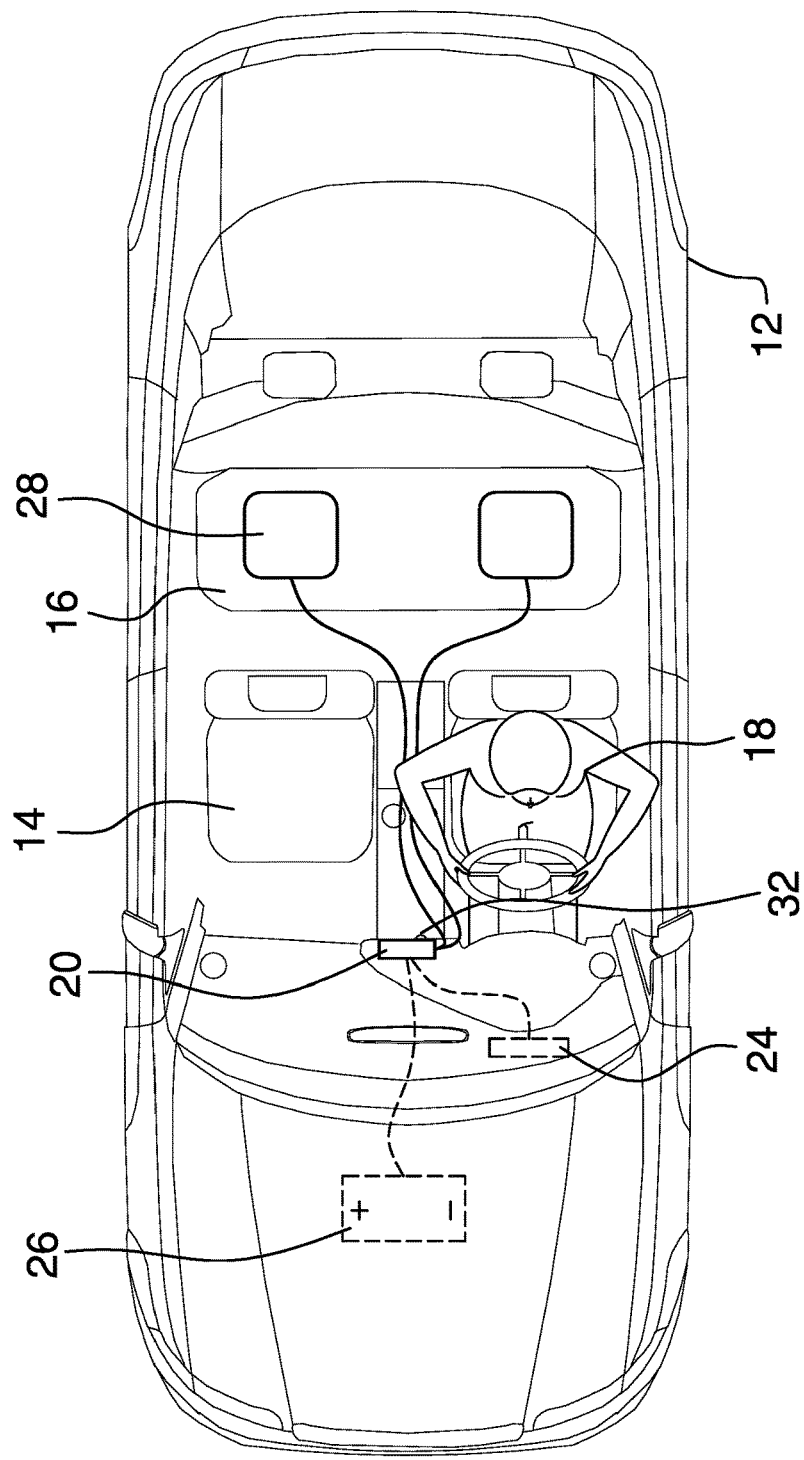
FIG. 4 is a top view of an embodiment of the disclosure.
Figure 5:
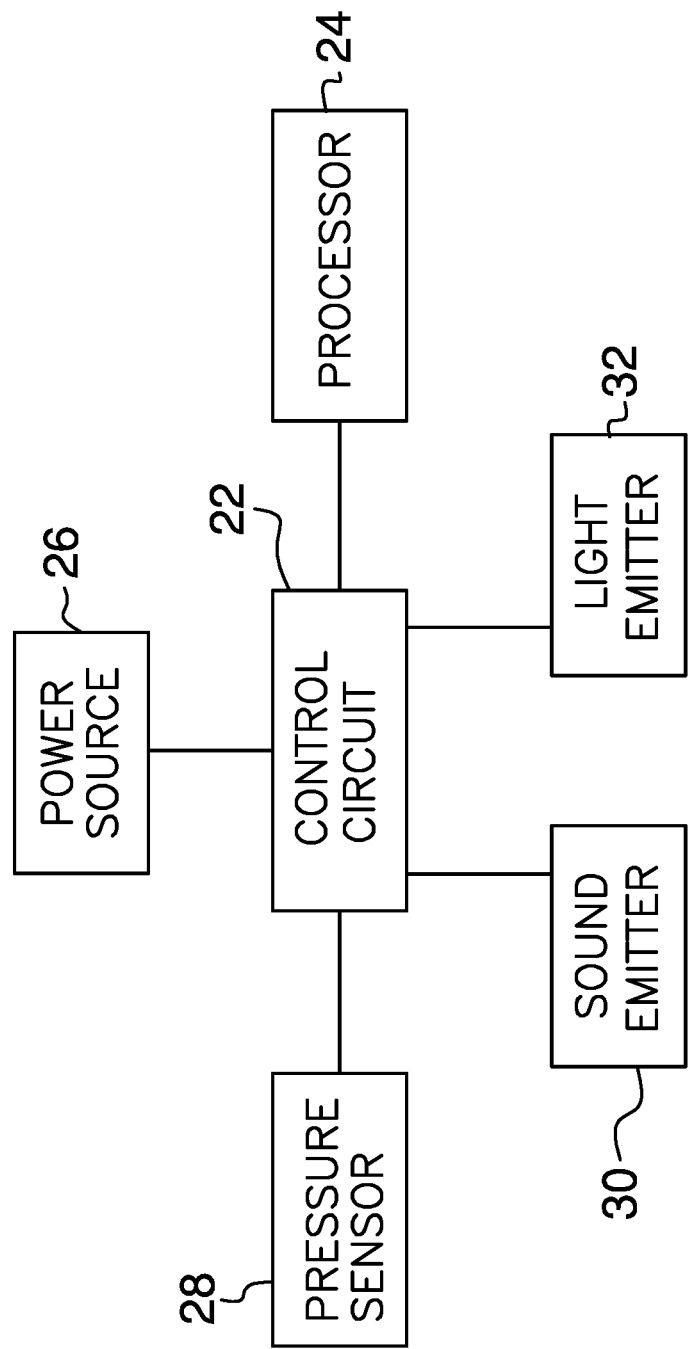
FIG. 5 is a schematic box diagraph of an embodiment of the disclosure.

With reference now to the drawings, and in particular to FIGS. 1 through 6 thereof, a new warning device embodying the principles and concepts of an embodiment of the disclosure and generally designated by the reference numeral 10 will be described.

As best illustrated in FIGS. 1 through 6, the vehicle occupancy alerting system 10 generally comprises a conventional vehicle 12 and a plurality of seats 14 mounted within the vehicle 12. The plurality of seats 14 includes a back seat 16 that may include a single elongated seat or a plurality of individual seats. An occupant warning system is included and warns a driver 18 of the vehicle 12 that a person 18 is on the back seat 16 when the vehicle 12 has been turned off.

The occupant warning system comprises a housing 20 with a control circuit 22 mounted therein. The control circuit 22 is in communication with a processor 24 of the vehicle 12. The processor 24 sends a powered signal or an unpowered signal to the control circuit 22 associated with a powered state of the vehicle 12. A power source 26 is electrically coupled to the control circuit 22 and may comprise an electrical power system of the vehicle 12. A plurality of pressure sensors 28 is electrically coupled to the control circuit 22. Each of the pressure sensors 28 is positioned remote of the housing 20. At least one of the pressure sensors 28 is positioned on the back seat 16.

A sound emitter 30 is mounted in the housing 20 and is electrically coupled to the control circuit 22. The sound emitter 30 emits an audible alarm when the control circuit 22 receives the unpowered signal and one of the pressure sensors 28 detects pressure greater than 5.0 lbs. A light emitter 32 is mounted on the housing 20 and is electrically coupled to the control circuit 22. The light emitter 32 emits a visible light when the control circuit 22 receives the unpowered signal and one of the pressure sensors 28 detects pressure greater than 5.0 lbs.

In use, the occupant warning system alerts a driver 18 of a vehicle 12 to passengers located in the vehicle 12. The sound emitter 30 emits an audible alarm and the light emitter 32 emits a visible light when one of the pressure sensors 28 detects pressure greater than 5.0 lbs and the vehicle is powered off. The audible alarm and light emitter warn the driver of a passenger positioned in the back seat 16 of the vehicle 12.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A warning system for alerting a driver of a passenger positioned in a vehicle, said assembly comprising:
   a vehicle and a plurality of seats being mounted within said vehicle, said plurality of seats including a back seat; and
   an occupant warning system being configured to warn a driver of said vehicle that a person is on said back seat when said vehicle has been turned off, said occupant warning system comprising
      a housing, said housing being configured for positioning on a dashboard of said vehicle wherein said housing is further configured to be visible to the driver of the vehicle,
      a control circuit being mounted in said housing, said control circuit being in communication with a processor of said vehicle, said processor sending a powered signal or an unpowered signal to said control circuit associated with a powered state of said vehicle,
      a power source being electrically coupled to said control circuit,
      a plurality of pressure sensors being electrically coupled to said control circuit, each of said pressure sensors being positioned remote of said housing,
      a sound emitter being mounted in said housing and being electrically coupled to said control circuit, said sound emitter emitting an audible alarm when said control circuit receives said unpowered signal and one of said pressure sensors detects pressure, and
      a light emitter being mounted on said housing and being electrically coupled to said control circuit, said light emitter emitting a visible light when said control circuit receives said unpowered signal and one of said pressure sensors detects pressure.

2. The warning system according to claim 1, wherein said power source comprises an electrical power system of said vehicle.

3. The warning system according to claim 1, wherein at least one of said pressure sensors is positioned on said back seat.

4. The warning system according to claim 1, wherein said sound emitter emits an audible alarm when said control circuit receives said unpowered signal and one of said pressure sensors detects pressure greater than 5.0 lbs.

5. The warning system according to claim 1, wherein said light emitter emits a visible light when said control circuit receives said unpowered signal and one of said pressure sensors detects pressure greater than 5.0 lbs.

6. A warning system for alerting a driver of a passenger positioned in a vehicle, said assembly comprising:
   a vehicle and a plurality of seats being mounted within said vehicle, said plurality of seats including a back seat;
   an occupant warning system being configured to warn a driver of said vehicle that a person is on said back seat when said vehicle has been turned off, said occupant warning system comprising:
      a housing, said housing being configured for positioning on a dashboard of said vehicle wherein said housing is further configured to be visible to the driver of the vehicle;
      a control circuit being mounted in said housing, said control circuit being in communication with a processor of said vehicle, said processor sending a powered signal or an unpowered signal to said control circuit associated with a powered state of said vehicle;
      a power source being electrically coupled to said control circuit, said power source comprising an electrical power system of said vehicle;
      a plurality of pressure sensors being electrically coupled to said control circuit, each of said pressure sensors being positioned remote of said housing, at least one of said pressure sensors being positioned on said back seat;
      a sound emitter being mounted in said housing and being electrically coupled to said control circuit, said sound emitter emitting an audible alarm when said control circuit receives said unpowered signal and one of said pressure sensors detects pressure greater than 5.0 lbs; and
      a light emitter being mounted on said housing and being electrically coupled to said control circuit, said light emitter emitting a visible light when said control circuit receives said unpowered signal and one of said pressure sensors detects pressure greater than 5.0 lbs.

* * * * *